(12) United States Patent
Lin et al.

(10) Patent No.: US 9,075,981 B2
(45) Date of Patent: Jul. 7, 2015

(54) NON-TEXTUAL SECURITY USING PORTRAITS

(75) Inventors: Chang-Chih Lin, Taipei (TW); Kai-Li Chiang, Taipei (TW)

(73) Assignee: YAHOO! INC., Sunnyvale, CA (US)

( * ) Notice: Subject to any disclaimer, the term of this patent is extended or adjusted under 35 U.S.C. 154(b) by 476 days.

(21) Appl. No.: 13/027,276

(22) Filed: Feb. 15, 2011

(65) Prior Publication Data

US 2012/0210409 A1    Aug. 16, 2012

(51) Int. Cl.
*G06F 15/16* (2006.01)
*G06F 17/30* (2006.01)
*H04L 29/06* (2006.01)
*G06F 21/36* (2013.01)
*G06F 21/00* (2013.01)

(52) U.S. Cl.
CPC ................ *G06F 21/36* (2013.01); *H04L 63/08* (2013.01)

(58) Field of Classification Search
CPC .......... G06F 21/00; G06F 21/36; H04L 63/08
USPC .......... 713/168–174, 182–186, 202; 709/225, 709/229; 726/2–8
See application file for complete search history.

(56) References Cited

U.S. PATENT DOCUMENTS

| 7,207,480 | B1 * | 4/2007 | Geddes | 235/380 |
| 2007/0101010 | A1 * | 5/2007 | Ellison et al. | 709/229 |
| 2012/0144468 | A1 * | 6/2012 | Pratt et al. | 726/7 |

\* cited by examiner

*Primary Examiner* — Evans Desrosiers
(74) *Attorney, Agent, or Firm* — James J. DeCarlo; Greenberg Traurig, LLP

(57) ABSTRACT

A user is authenticated using portraits of known contacts. During a challenge-response process, a collection of portraits are presented, some known to an authenticated user and some randomly selected. Responsive to correctly identifying the known portraits, the user is granted access to a system.

16 Claims, 7 Drawing Sheets

NON-TEXTUAL SECURITY USING PORTRAITS

BACKGROUND

1. Technical Field

Embodiments of the invention relate generally to challenge-response security systems, and more specifically, using portraits for security without textual phrases.

2. Prior Art

Many people use computers and the Internet to store sensitive data, such as financial information or personal messages. State of the art systems use a challenge-response system for gaining access to user data. For example, a valid username and corresponding password are requested for access to banking web sites and to Yahoo! Mail.

Problematically, as more accounts are available online, each user has more usernames and passwords to remember. Some accounts have unique requirements which prevent the user of common usernames and passwords (e.g., account number or at least one non-alphanumeric character). Furthermore, users are increasingly accessing accounts from smart telephones and tablet computers. These devices can have very small, and thus, difficult to use physical or virtual keyboards. Traditional challenge-response techniques are difficult to use in these environments.

In the light of the foregoing discussion, there is a need for challenge-response security using portraits.

SUMMARY

The above-mentioned needs are met by a method, computer program product and system for verifying a user with portraits. In one embedment, no text is entered during authentication.

In one embodiment, a user is authenticated using portraits of known contacts. During a challenge-response process, a collection of portraits are presented, some known to an authenticated user and some randomly selected. Responsive to correctly identifying the known portraits, the user is granted access to a system.

In another embodiment, portraits known to a user are automatically selected. When used in a social network, known portraits can be automatically selected from friend profile pictures or tags. Also, known portraits can be manually uploaded by a user.

Advantageously, a user can easily and securely log-in to a system without having to remember credentials and without using text.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

The above-mentioned needs are met by a method, computer program product and system for securing an account using portraits. In one embodiment, the account can be accessed without entering text. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
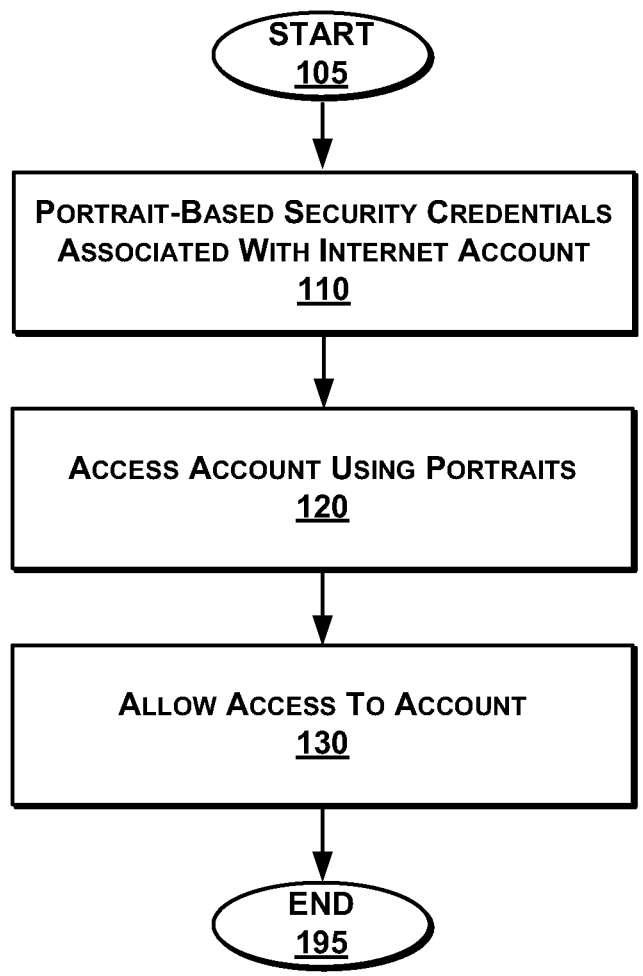
FIG. 1 is a flow chart illustrating a method for account security using portraits according to an embodiment.

FIG. 1 is a flow chart illustrating a method 100 for account security using portraits according to an embodiment.

At step 110, portrait-based security credentials are associated with an Internet account, as described below with respect to FIG. 2. The account can be any type of account, but typically relates to some type of personal information. In some cases, the personal information is private or sensitive, such as financial accounts or message accounts. In one example, an online bank account stores bank account or credit card numbers, account balances, an exhaustive list of financial transactions showing amounts and locations of purchases, and more. In another example, an online mail account such as Yahoo! Mail stores e-mails between an individual and personal friends and business associates. Further, such an account can store a personal address book, calendar, and notes. In other embodiments, the account can be stored locally or over a network other than the Internet (e.g., a LAN).

In still another example, an account can link an individual to social networking with friends (or categories of friends), associates, followers, or fans. Social networking web sites such as Yahoo! Pulse or Facebook allow a user to communicate with and track the activities of approved friends. The account can include a profile picture showing a candid or posed portrait of the user. Each friend can also have a profile picture. Additionally, pictures can be uploaded and tagged by other users. When tagging, a picture uploaded by a user that includes a friend is marked for sharing. As a result, mutual friends and others can view the picture from the friend's account. Some users post hundreds of pictures of themselves and friends.

Security credentials are designed to prevent individuals and software bots other than an authorized individual or bot from accessing the information. On the other hand, the authorized user can access the account from any Internet connection whether it be from the user's personal computer to a publicly-available personal computer at an Internet café. One type of security credential paradigm is the challenge-response technique. A user attempting to access an account is presented with a predetermined request for information such as username and password. The user responds by providing the assigned or customized information that is typically provided when the account is set-up.

The portraits can be any photograph of likeness of a subject. In one embodiment, some or all portraits are photographs of friends or contacts known to a user. Some portraits may have been tagged personally by a user, and some portraits may have been tagged by another friend of the user. Preferably, the rendition of a friend in a portrait is recognizable a user attempting authentication.

Additional embodiments of step 110 are discussed below with respect to FIG. 2.

At step 120, an account is accessed using portraits, as described below with respect to FIG. 3. By identifying a sample of portraits that include friends of a user from a larger set of random portraits, the user is authenticated.

At step 130, a user is given access to an account. Once a user has been authenticated, the stored data is available to the user for the duration of a session. Additionally, the user can create, modify or delete the data. Authenticated transactions may be carried out (e.g., transfer of funds). The session can be defined in a variety of ways. In one embodiment, the session can last until a browser or browser tab is closed. In another embodiment a session can span across opening and closing browsers as facilitated by as background process that is authenticated until explicitly stopped.

Figure 2:
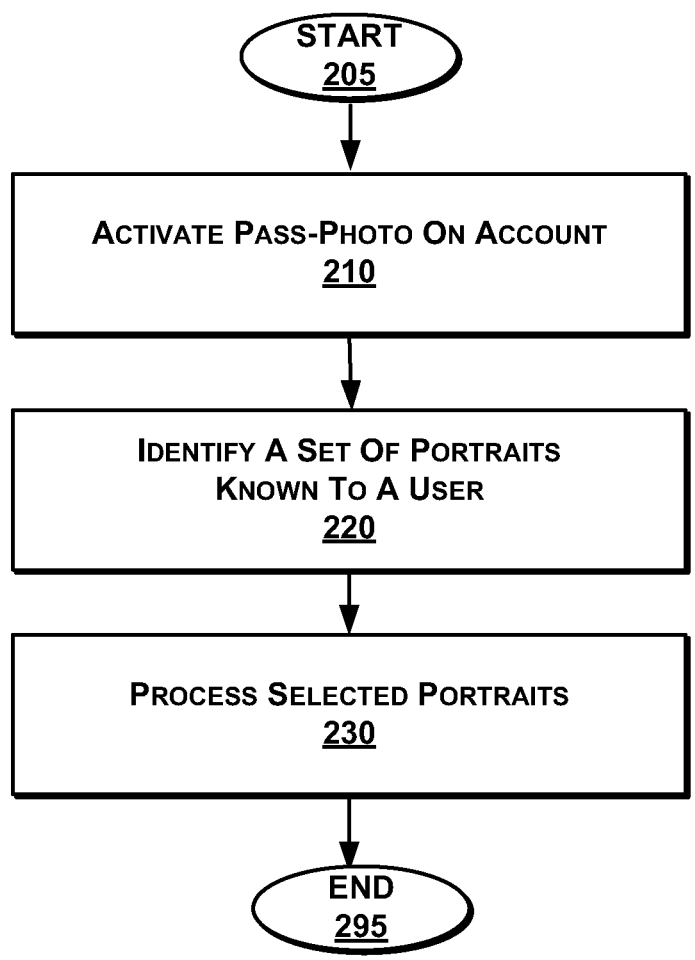
FIG. 2 is a flow chart illustrating a method for configuring portrait-based security credentials according to an embodiment.

FIG. 2 is a flow chart illustrating an example of step 110 for configuring portrait-based security credentials according to an embodiment.

At step 210 a user activates pass-photo. In one embodiment, pass-photo is an optional feature that is activated through the settings of an account (e.g., a drop down menu). Pass-photo can be an optional feature that is turned on or off using account settings. Pass-photo can also be used in addition to a text password requirement. In one embodiment, pass-photo, by virtue of its unpredictability, is used to prevent automated log-ins from being performed by a bot. Pass-photo can also be configured for automatic activation when authenticating from a device such as a smart telephone that does not use a traditional keyboard.

At step 220, a set of portraits known to a user are identified. In one embodiment, known pictures are uploaded to an account. The pictures can be portraits, or non-portraits since the subject matter should be recognizable to the user. Pictures may need to be uploaded for accounts that do not inherently host pictures.

Many social networks already include pictures associated with an account and thus, do not need to be uploaded. In this case, pictures of friends (or categories of friends) are selected from tags and profiles. The pictures can be from a user account, a friend account, a friend of friend account, or any account or other Internet source (e.g., Yahoo! Image Searcy) in which that friend is positively identified. In some embodiments, a pool of known pictures is updated. Updates can occur whenever new portraits are identified, or periodically. Also, a user may manually configure automatically selected portraits, such as those that are confusing.

In one embodiment, a predetermined number of pictures must be uploaded to meet certain security criteria. Additional pictures allow more combinations for authentication, and thus, a more secure system.

In some embodiments, a stock of random pictures is provided. These pictures are not known to the user and help distinguish an authenticated user from a hacker.

At step 230, selected portraits are processed to determine whether they are appropriate for pass-photos. In one embodiment, the pictures are automatically verified as portraits when automatically selected (i.e., rather than user selected pictures).

Figure 3:
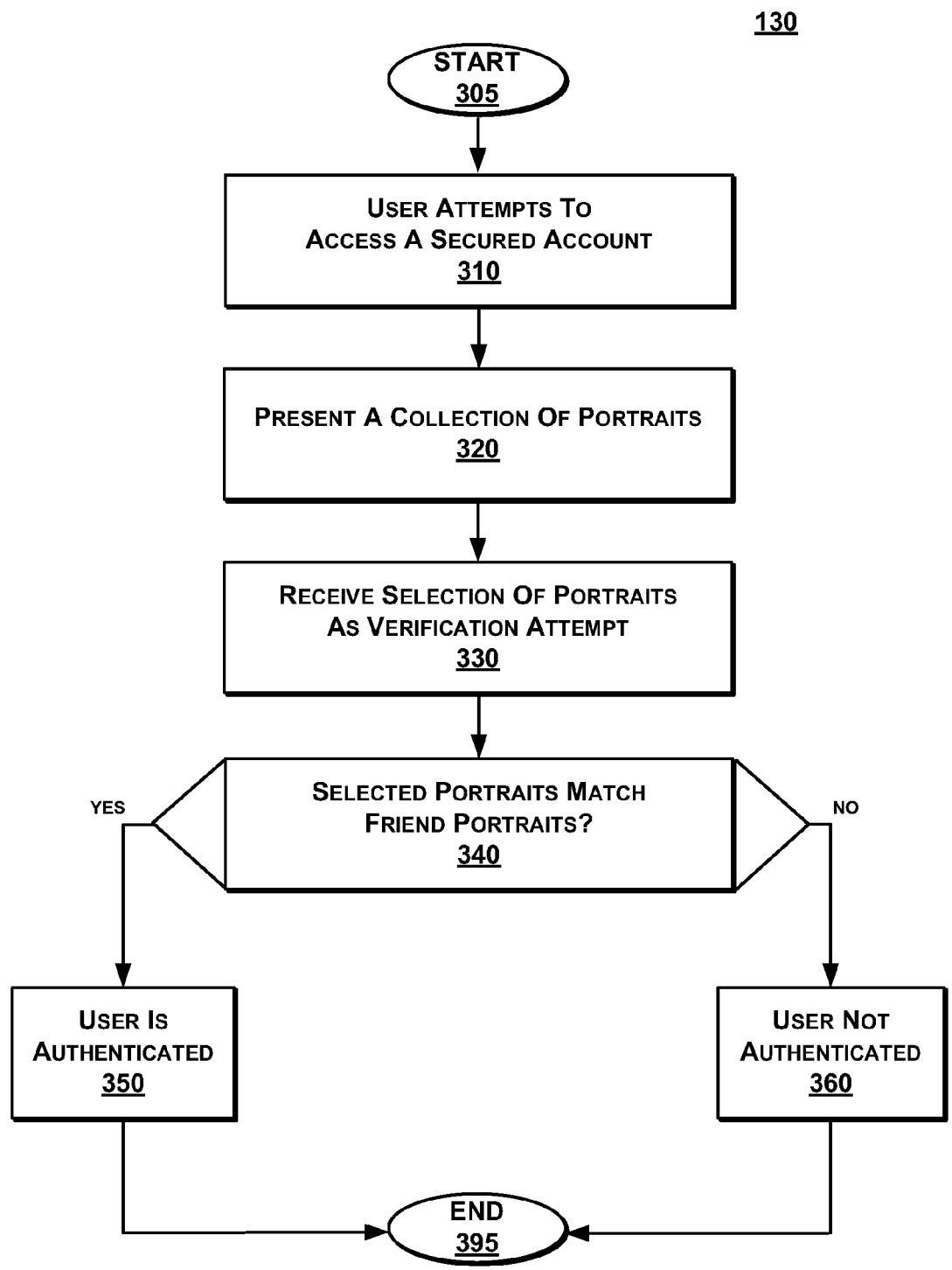
FIG. 3 is a flow chart illustrating a method for entry of portrait-based security credentials according to an embodiment.

FIG. 3 is a flow chart illustrating an example of step 130 for entry of portrait-based security credentials according to an embodiment.

At step 310, a user attempts to access a secured account. From any type of computing device, a browser or other application can access a URL leading to an account. A page showing non-sensitive parts of the account can be presented along with a challenge-response using portraits as described herein.

At step 320, a collection of portraits is presented to a user. Some of the collection includes friends known to the user, while some of the collection includes random pictures. The ratio of friends and strangers can vary (i.e., 3 friends can be presented in one instance, and 2 friends can be presented in a separate instance).

In one embodiment, the number of stranger pictures is limited. Otherwise, if the stranger pictures change each time and the friend pictures are limited, a potential hacker can continually refresh a web page to deduce which photos are friends.

At step 330, a user enters a selection of portraits as a verification attempt. For example, two portraits out of ten presented may be recognized as friends. A touch screen, mouse or other pointing device can be used to make the choices. If both portraits are correct, access may automatically be granted. Alternatively, a virtual button may need to be depressed for verification.

At step 340, if the selected portraits match the known portraits, a user is authenticated at step 350, and if not, a user is not authenticated at step 360. In some embodiments, a user can make another attempt at authentication. In other embodiments, a user is given a predetermined number of attempts (e.g., three attempts) before being locked out of the account.

On the other hand, at step 350, if the selected portraits do not match the known portraits, a user is denied access to the account and must make another authentication attempts.

Figure 4:
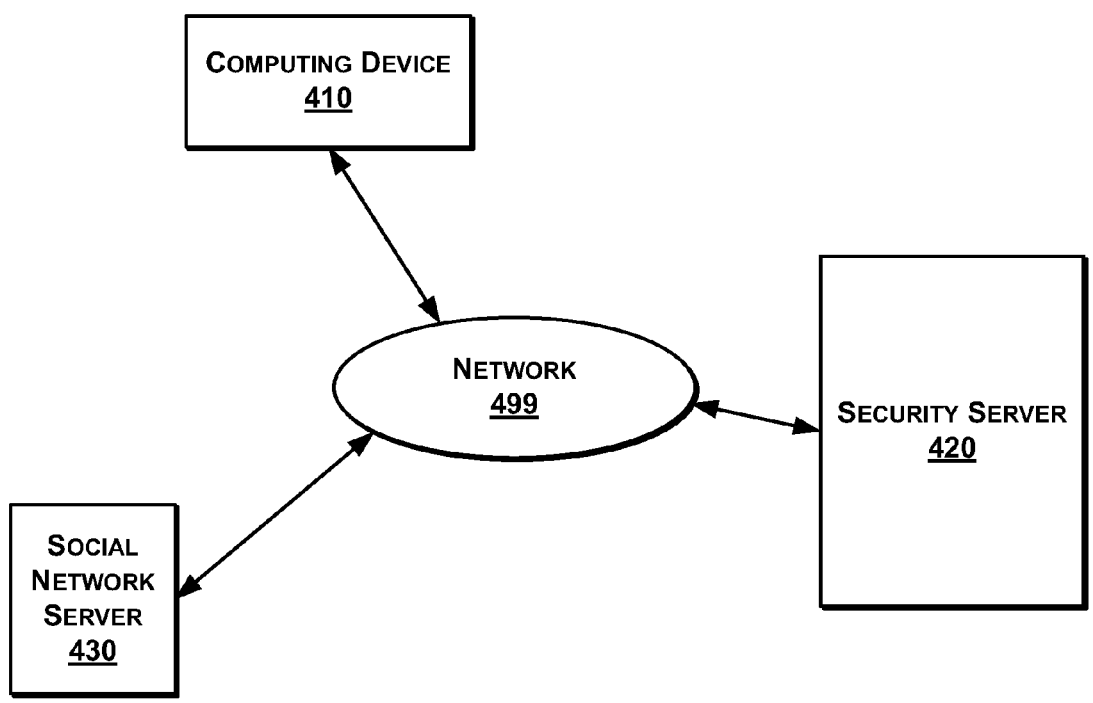
FIG. 4 is a block diagram illustrating a system for account security using portraits according to an embodiment.

FIG. 4 is a block diagram illustrating a system 400 for account security using portraits according to an embodiment. The system 400 can implement methods discussed above. The system 400 includes a computing device 410, an security server 420, and a social network server 430 coupled in communication through a network 499 (e.g., the Internet, a LAN, a WAN, a cellular network or any combination).

The computing device 410 can be, for example, a PC, a stationary computing device, a laptop or notebook computer, a tablet computer, a smart phone or PDA, a smart appliance, a video gaming console, an Internet television, a set-top box, or any other suitable processor-based device that can send view advertisements. There can be numerous computing devices 410 used by different users. In one embodiment, the computing device 410 provides user access to an online account. Additional embodiments of the computing device 410 are described in more detail below.

The security server 420 can be one or more of any of the above processor-based devices. In one embodiment, security server manages configuration and operation of the challenge-response paradigm as described herein. Additional embodiments of the security server 420 are described in more detail below.

The social network server 430 can be one or more of any of the above processing-based devices. In one embodiment, the social network server 430 hosts a social networking web site such as Yahoo! Profile, Facebook or Twitter. In one embodiment, the social network server 430 and the security server 420 can be part of a single device, or be operated by a single entity. In other embodiments, they are separately maintained.

Figure 5:
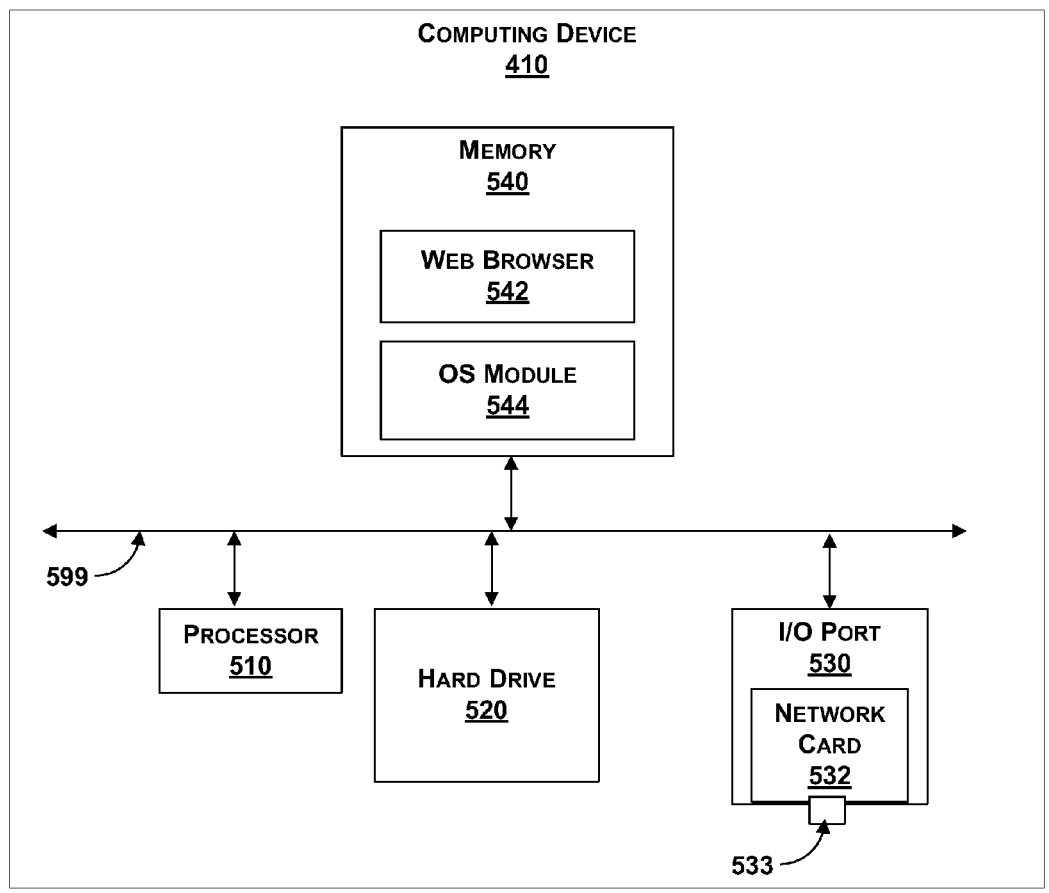
FIG. 5 is a block diagram illustrating a computing device according to an embodiment.

FIG. 5 is a block diagram illustrating an exemplary computing device 410 according to an embodiment. The computing device 410 includes a processor 510, a hard drive 520, an I/O port 530, and a memory 540 coupled by a bus 599.

The bus 599 can be soldered to one or more motherboards. The processor 510 can be a general purpose processor, an application-specific integrated circuit (ASIC), an FPGA (Field Programmable Gate Array), a RISC (Reduced Instruction Set Controller) processor, an integrated circuit, or the like. There can be a single core, multiple cores, or more than one processor. In one embodiment, the processor 510 is specially suited for the processing demands of accessing an account (e.g., custom micro-code, instruction fetching, pipelining or cache sizes). The processor 510 can be disposed on silicon or any other suitable material. In operation, the processor 510 can receive and execute instructions and data stored in the memory 540 or the hard drive 520. The hard drive 520 can be a platter-based storage device, a flash drive, an external drive, a persistent memory device, or any other type of memory.

The hard drive 520 provides persistent (i.e., long term) storage for instructions and data. The I/O port 520 is an input/output panel including a network card 522. The network card 522 can be, for example, a wired networking card (e.g., a USB card, or an IEEE 802.3 card), a wireless networking card (e.g., an IEEE 802.11 card, or a Bluetooth card), a cellular networking card (e.g., a 3G card). An interface 523 is configured according to networking compatibility. For example, a wired networking card includes a physical port to plug in a cord, and a wireless networking card includes an antennae. The network card 522 provides access to a communication channel on a network.

The memory 540 can be a RAM (Random Access Memory), a flash memory, a non-persistent memory device, or any other device capable of storing program instructions being executed. The memory 540 further comprises a web browser 542, and an OS (operating system) module 544. The OS module 544 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 542 can be a desktop web browser (e.g., Internet Explorer, Mozilla, or Chrome), a mobile browser, or a web viewer built integrated into an application program. In an embodiment, a user accesses a system on the World Wide Web (WWW) through a network such as the Internet. The web browser 542 is used to download web pages or other content in various formats including HTML, XML, text, PDF, and postscript, and may be used to upload information to other parts of the system. The web browser 642 may use URLs to identify resources on the web and HTTP (HyperText Transfer Protocol) in transferring files on the web. In one embodiment, the web browser 542 provides a user interface for a user account being accessed.

Figure 6:
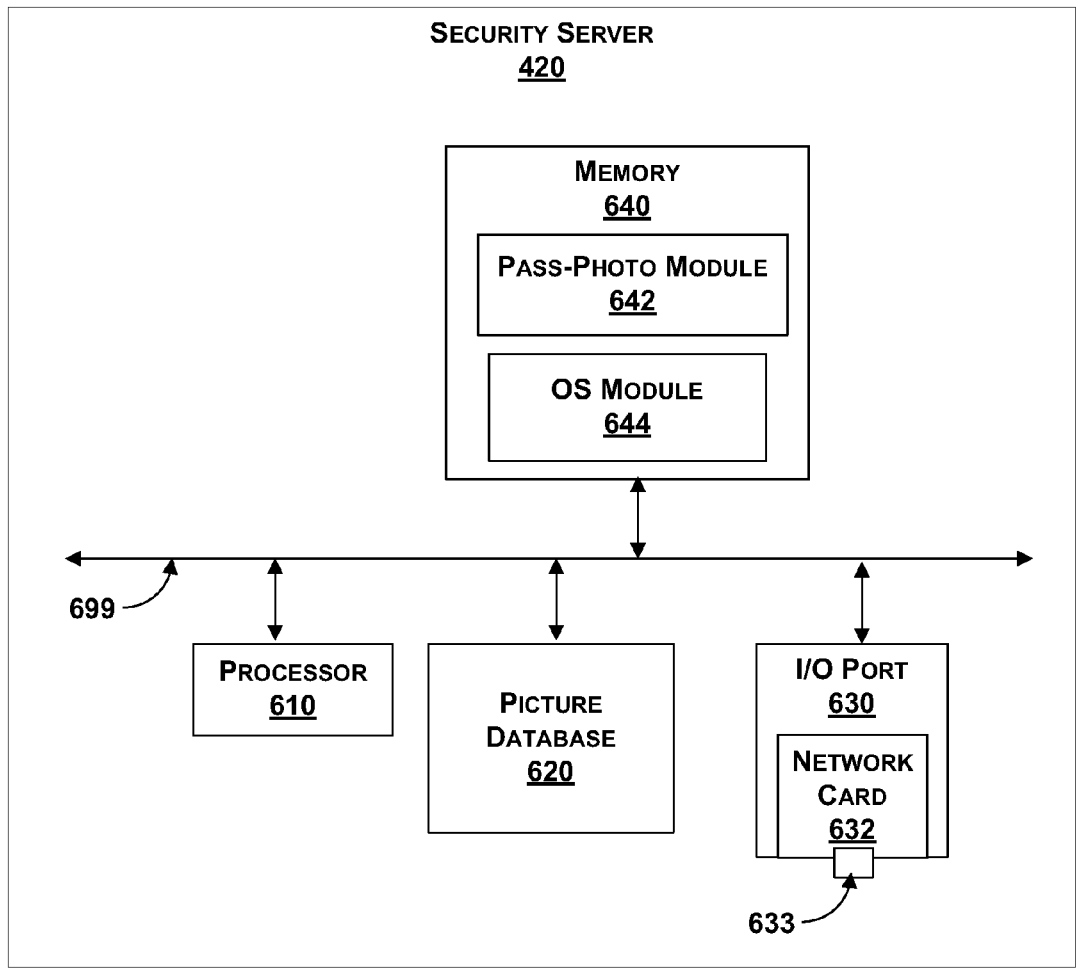
FIG. 6 is a block diagram illustrating a security server according to an embodiment.

FIG. 6 is a block diagram illustrating an exemplary security server 420 according to an embodiment. The security server 420 includes a processor 610, a picture database 620, an I/O port 630, and a memory 640, coupled by a bus 699. The processor 610, a hard drive 620, and the I/O port 630 can be configured as described above with respect to FIG. 5.

The memory 640 comprises an OS module 644, as described above, along with a pass-photo module 642. The pass-photo module 642 authenticates a user to the social network server 430 of FIG. 4. The pass-photo module 642 is described in more detail below.

Figure 7:
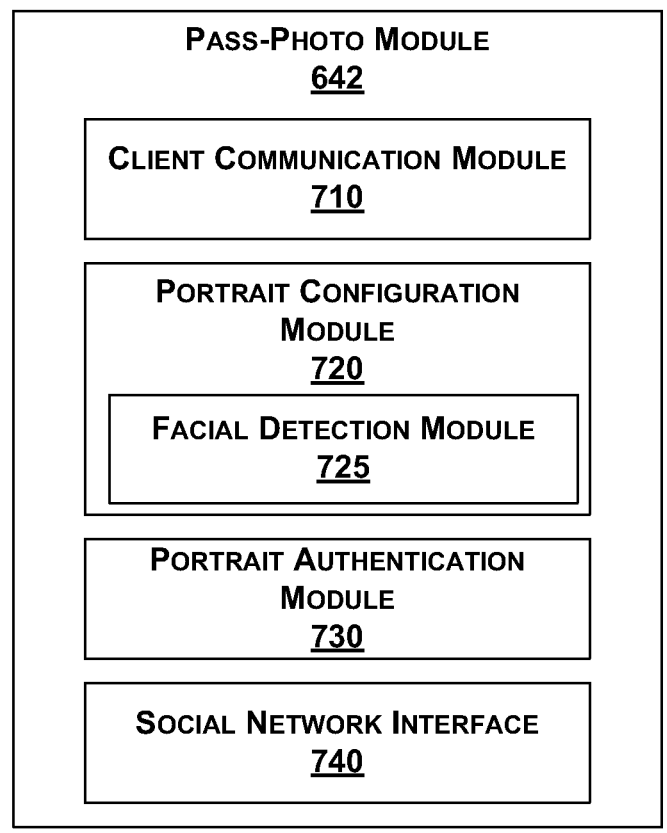
FIG. 7 is a block diagram illustrating a photo-pass module according to an embodiment.

FIG. 7 is a block diagram of an exemplary photo-pass module 642 according to an embodiment. The pass-photo module 642 includes a client communication module 710, a portrait configuration module 720, a portrait authentication 730 and a social networking interface 740. The components can communicate with each other through, for example, APIs (Application Programming Interfaces). In other embodiments, all or parts of the components can be implemented in hardware or benefit from special hardware accelerators.

In one embodiment, the client communication module 710 sends and receives information from the computing device 410 of FIG. 4 using APIs transported within network packets. The portrait configuration module 720 identifies and processes portraits known to a user. In one embodiment, the portrait configuration module 720 further comprise a facial detection module 725 to verify that a portrait includes a face and characterize features of the face for matching. The portrait authentication module 730 manages the challenge-response to authenticate a user. The social network interface 740 interacts with a social network to identify authenticated users as described herein.

As described herein, computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). Many of the functionalities described herein can be implemented in computer software, computer hardware, or a combination.

Furthermore, the computer that is running the previously mentioned computer software may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   presenting, by a processor as a challenge to a user who is to be verified, a sample of portraits from a plurality of portraits associated with the user and a limited plurality of random portraits that are not associated with the user, wherein the challenge for the user is to select, from among the sample of portraits, those portraits which are of persons known to the user to be verified, the sample of portraits not comprising a portrait of the user;
   verifying, by the processor, that the plurality of portraits each comprise a face;
   receiving, by the processor as a response to the challenge, the user's selection of portraits as a verification attempt;
   responsive to the user's selection of portraits matching the sample portraits, confirming, by the processor, the user; and
   providing, by the processor, access to the user to an account, where data in the account is available to the user for duration of a session.

2. The method of claim 1, wherein the plurality of portraits comprise contacts from a social network.

3. The method of claim 1, wherein responsive to the selection of portraits not matching the sample portraits, not confirming the user.

4. The method of claim 1, further comprising: receiving an upload of the plurality of portraits from the user.

5. The method of claim 1, wherein the user is verified by entering a selection of portraits using one of a touch screen, a mouse, and another pointing device without entering text.

6. A non-transitory computer-readable storage medium that when executed by a processor, performs a method for verifying a user, comprising:
   presenting, as a challenge to the user who is to be verified, a sample of portraits from a plurality of portraits associated with the user and a limited plurality of random portraits that are not associated with the user, wherein the challenge for the user is to select, from among the sample of portraits, those portraits which are of persons known to the user to be verified, the sample of portraits not comprising a portrait of the user;
   verifying that the plurality of portraits each comprise a face;
   receiving, as a response to the challenge, the user's selection of portraits as a verification attempt;
   responsive to the user's selection of portraits matching the sample portraits, confirming the user; and
   providing access to the user to an account, where data in the account is available to the user for duration of a session.

7. The medium of claim 6, wherein the plurality of portraits comprise contacts from a social network.

8. The medium of claim 6, wherein responsive to the selection of portraits not matching the sample portraits, not confirming the user.

9. The medium of claim 8, wherein the user is verified by entering a selection of portraits using one of a touch screen, a mouse, and another pointing device without entering text.

10. The medium of claim 6, further comprising: receiving an upload of the plurality of portraits from the user.

11. A system comprising:
    a processor coupled to a memory;
    a storage medium for tangibly storing thereon program logic for execution by the processor, the program logic comprising:
    presenting logic executed by the processor for presenting to the user through a user output interface, as a challenge to the user who is to be verified, a sample of portraits from a plurality of portraits associated with the user and a limited plurality of random portraits that are not associated with the user, wherein the challenge for the user is to select, from among the sample of portraits, those portraits which are of persons known to the user to be verified, the sample of portraits not comprising a portrait of the user;
    verifying logic executed by the processor for verifying that the plurality of portraits each comprise a face;
    response logic executed by the processor for receiving, as a response to the challenge, selection of portraits chosen by the user and entered through a user input interface as a verification attempt;
    confirming logic executed by the processor for confirming, operable responsive to the user's selection of portraits matching the sample portraits, the user; and
    account access providing logic executed by the processor for providing access to the user to an account, where data in the account is available to the user for duration of a session.

12. The system of claim 11, wherein the plurality of portraits comprise contacts from a social network.

13. The system of claim 11, wherein the user confirmation software module, responsive to the selection of portraits not matching the sample portraits, does not confirm the user.

14. The system of claim 11, further comprising:
    a picture database for receiving an upload of the plurality of portraits from the user.

15. The system of claim 11, wherein a user is verified by entering a selection of portraits using one of a touch screen, a mouse, and another pointing device without using text.

16. The system of claim 11 further comprising: a device identifier to automatically implement photo-pass responsive to detecting that the user is using a mobile computing device.

* * * * *